Feb. 10, 1970   J. W. DOWNIE   3,495,249
RADAR HEIGHT READOUT SYSTEM
Filed Nov. 12, 1968   2 Sheets-Sheet 1
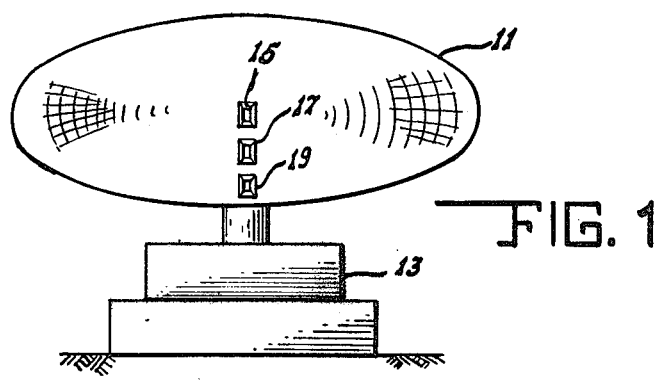
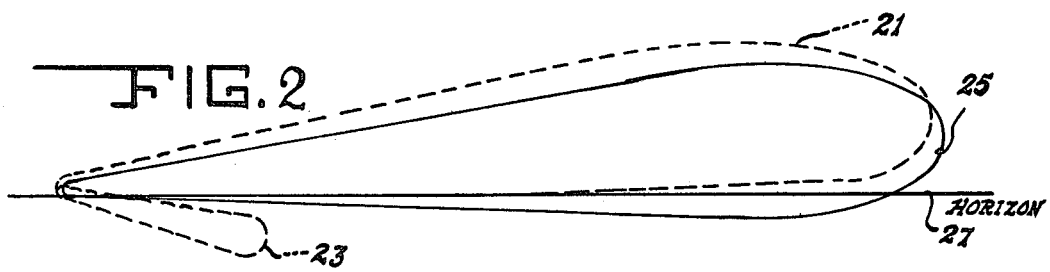
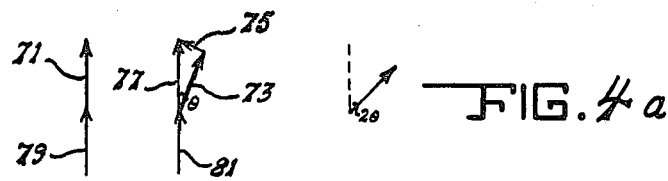
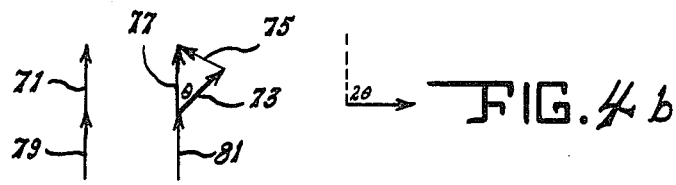
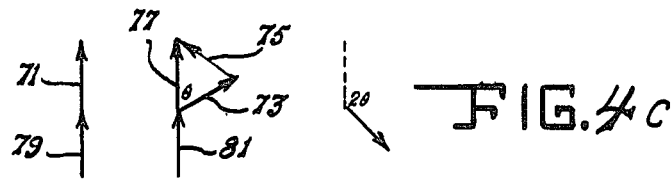
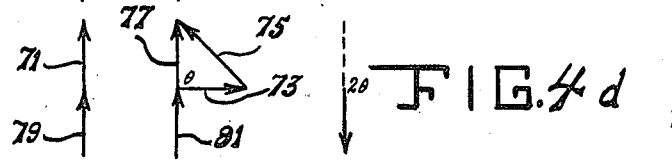
INVENTOR.
JOHN W. DOWNIE
BY
Julian L. Siegel
ATTORNEY INVENTOR.
JOHN W. DOWNIE
BY
Julian L. Siegel
ATTORNEY United States Patent Office 3,495,249
Patented Feb. 10, 1970

3,495,249
RADAR HEIGHT READOUT SYSTEM
John W. Downie, De Witt, N.Y., assignor to the United States of America as represented by the Secretary of the Air Force
Filed Nov. 12, 1968, Ser. No. 774,728
Int. Cl. G01s 5/04
U.S. Cl. 343—119                     3 Claims

ABSTRACT OF THE DISCLOSURE

A radar system operable in clutter having two auxiliary horns adjacent to the main horn, the horns being fed to a side lobe canceller. The main signal is mixed with a reference signal and the output is subtracted from auxiliary mixers fed by the auxiliary horns and the residue from the subtractor thus forming two loop circuits. One auxiliary mixer has one input controlled to remain in phase with the reference signal. A voltage pulse proportional to the elevation angle is obtained from a ratio detector fed by an auxiliary horn input and a signal formed by mixing that input with the subtractor residue.

BACKGROUND OF THE INVENTION

This invention relates to radar systems, and more particularly to a radar height readout system operable in the presence of clutter.

A defense system for tactical ballistic missiles usually includes a high power acquisition radar whose antenna pattern is cosecant squared. When an incoming target is identified and transferred to the target tracking radar, only azimuth information is provided and the target tracking radar must search in elevation of that azimuth to acquire the target. If the acquisition radar could provide an elevation angle it would aid the target tracking radar at a time when every second counts. Such an improvement is provided by this invention.

SUMMARY OF THE INVENTION

By adding two auxiliary horns adjacent to the main horns of a radar and connecting the three outputs into a modified side lobe canceller an output proportional to target height may be obtained, even in the presence of moderate clutter. The main signal coming from the lowest beam is fed to the main channel of the side lobe canceller where it is mixed with a reference signal. Signals from the middle and upper beams are fed to two canceller loop circuits where two correlation mixers generate control signals. One control signal is kept in phase with the reference signal.

It is an object of this invention to provide a novel radar that has a height readout.

It is another object to provide a radar system that has a height readout in the presence of clutter and jamming.

It is still another object to provide a three element antenna radar system using side lobe cancellers to obtain a height readout.

These and other advantages, features and objects of the invention will become more apparent from the following description taken in connection with the illustrative embodiment in the accompanying drawings, wherein:

DESCRIPTION OF THE DRAWINGS

FIGURE 1 is an assembly view showing the three-horn antenna arrangement;
FIGURE 2 is a power pattern diagram for two of the three horns.

FIGURES 4a to 4d are vector diagrams explaining the operation of the invention.

DESCRIPTION OF THE PREFERRED EMBODIMENT

Figure 3:
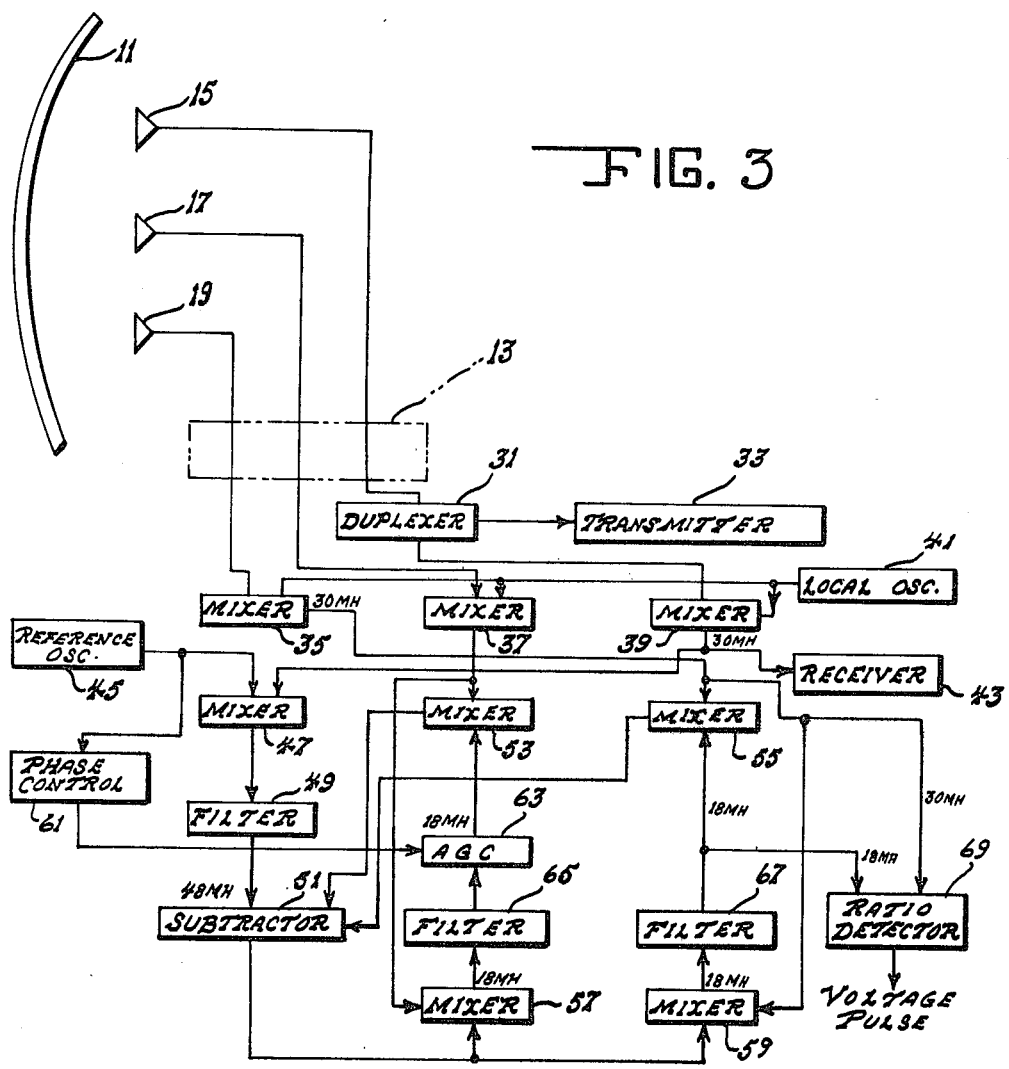
FIGURE 3 is a schematic diagram showing an embodiment of the invention.

Referring to FIGURE 1 which shows an assembly, reflector 11 is mounted on pedestal 13 and within reflector 11 are mounted three antenna elements or horns, main transmit-receive feedhorn 15 and below it first auxiliary horn 17 and second auxiliary horn 19. The spacing of the horns is such that the power pattern shown in FIGURE 2 is obtained. The vertical pattern of the lowest horn is in dotted lines showing main lobe 21 and side lobe 23 and the vertical pattern for the main feedhorn is in solid lines showing main lobe 25. The first vertical side lobe null of the upper or second auxiliary horn is on the horizon at 27. The pattern for the middle horn is not shown.

Referring to FIGURE 3, the RF signals from horns 15, 17 and 19 can be connected through pedestal 13 by a three-channel rotary joint (not shown). Horn 15 is fed to duplexer 31 which serves as a switch connecting horn 15 alternately to transmitter 33 and mixer 39 while horns 17 and 19 are fed to mixers 35 and 37. Stable local oscillator 41 also feeds mixers 35 and 37 as well as mixer 39 to obtain IF frequencies. The main IF signal coming from upper horn 15 is fed to the normal receiver 43 as well as to the main channel of the canceller. Auxiliary 1 and 2 signals are from horns 17 and 19 representing the middle and upper beams which go to the two canceller loop circuits. All three of these signals are at an intermediate frequency which is designated as 30 MHz. in this example. An 18 MHz. reference signal is generated by crystal oscillator 45, although other convenient frequencies can be used as the reference. However, a computer program has shown that 18 MHz. develops the lowest number of spurious signals in the desired pass bands when 30 MHz. is the IF frequency. The sum is selected from the output of mixer 47 and after filtering out the difference frequency by the filter 49, the 48 MHz. signal is fed to subtractor 51. Outputs from the other two mixers 53 and 55 are also fed into subtractor 51. If the sum of these two mixers' outputs are equal in phase and amplitude to the main signal, the result would be complete cancellation. However, a residue of the main signal is required at two correlator mixers 57 and 59 to generate the two 18 MHz. control signals which are the result of mixing the main residue with each of the auxiliary signals. The residue is automatically maintained by the two loops.

The control 18 MHz. signal from mixers 35 and 37 in auxiliary 1 loop is constrained to be in phase with the reference 18 MHz. signal by a manual one-time calibration adjustment of phase control 61. The 18 MHz. signal generated by correlation mixer 57 is therefore only able to control the amplitude of this signal through AGC circuit 63 which is fed by mixer 57 through narrow band filter 65. The controlled signal is then fed to mixer 53. There is no such restriction on auxiliary 2 loop whose correlation mixer 59 feeds mixer 55 through narrow band filter 67. It adjusts phase and amplitude to bring the resultant to the proper amplitude and phase for nearly complete cancellation. Ratio detector 69 provides a voltage pulse approximately proportional to the elevation angle regardless of signal amplitude and is fed by the filtered output of mixer 59 and the IF signal from lowest horn 19. The integrating filters in the canceller are made wide enough to lock on a target pulse.

The operation of the invention when the target is in the clear is explained in FIGURES 4a to 4d where the target elevation is 7½°, 15°, 22½°, and 30°, respectively.

The scale is such that the angles shown ($\theta$ and $2\theta$) are multiplied by the factor of 3. Vectors 71 represent the main mixer input and output; vectors 73 represent the auxiliary 1 input, vectors 75 represent the amplitude and phase of auxiliary 2 mixer output, and vectors 77 represent the resultant of the auxiliary loop mixer outputs.

Assuming an incoming target signal has a given amplitude and phase in the main receiver, its amplitude will be approximately the same in auxiliary 1 and auxiliary 2 but its phase will be shifted $\theta$ and $2\theta$ by the angle of elevation. (The degrees of elevation shown are calculated from a current acquisition radar's parameters.) Since the reference 18 MHz. feeds both the main and auxiliary 1 mixers, auxiliary 2 must supply the vector amplitude and phase which will combine with the auxiliary 1 mixer output to cancel the signal in the main. Vectors 75 will be generated by correlation in auxiliary loop 2 and the resultant, when shifted 180° in phase by the subtractor (canceller), will minimize the residue. The error signal amplitude in auxiliary 2 will be proportional to the amplitude of vectors 75 and when normalized by the ratio detector, will be approximately proportional to target elevation angle. Loop 1 correlation mixer 57 has no function when the target is in the clear except to maintain the gain of the target signal approximately equal to that of the main and auxiliary 2.

The additional vectors 79 shown in FIGURES 4a to 4d represent clutter added to the target signal and vectors 81 represent the corresponding added resultant vector. Loop 1 phase is initially adjusted manually on clutter only so it operates as a conventional moving target indicator (MTI). Under target plus clutter conditions, the auxiliary 1 loop regulates its gain and phase to minimize the target residue. The presence of some clutter can thus be tolerated without unduly affecting the accuracy of height readout.

Figure 5:
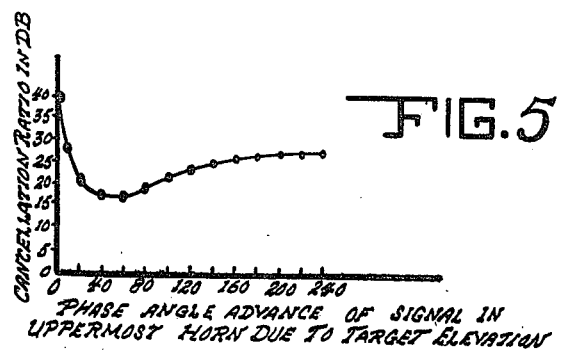
FIGURE 5 is a composite graph for a special case of jamming.

FIGURE 5 shows a composite plot for a special case where a two-loop canceller is used against two jammers. Jammer 1 is at 0° elevation which represents the clutter, and the delay at the center horn is always half of the lower horn. The ordinate represents the average cancellation ratio in db and the abscissa represents the phase angle advance of the signal in the uppermost or main horn due to target elevation. The elevation angle is such that those shown in the plot are equivalent to those discussed in FIGURES 4a to 4d when multiplied by a factor of 3. It thus appears that an average cancellation ratio of about 20 db can be expected for most conditions, corresponding to an elevation angle error in the neighborhood of 1°.

As an example, the antenna can be designed so that the nose of the main lobe is tipped up 3°20'. Its first vertical null is 8°40' below the nose so this means that the lowest horn would have to be placed so that its first null would be on the horizon. At a distance of twelve feet from the parabola the lowest horn would fall to −7 db at 5°20' above the horizon (referred to sensitivity at the nose) and to about −30 db on the horizon.

Although the invention has been described with reference to a particular embodiment, it will be understood to those skilled in the art that the invention is capable of a variety of alternative embodiments within the spirit and scope of the appended claims.

I claim:
1. A radar readout system comprising:
   (a) an antenna having first, second, and third elements;
   (b) a plurality of mixers including first, second and third mixers fed respectively by the first, second, and third elements of the antenna;
   (c) a reference frequency source feeding the first mixer and the second mixer;
   (d) a subtractor fed by the plurality of mixers;
   (e) a fourth mixer fed by the second antenna element and the subtractor means;
   (f) a phase control means and an automatic gain control circuit interposed between the reference frequency source and the second mixer and controlled by the output of the fourth mixer;
   (g) a fifth mixer fed by the third antenna element and the subtractor; and
   (h) means for generating a voltage pulse proportional to elevation angle, the pulse generating means being fed by the third antenna element and the output of the fifth mixer.
2. A radar height readout system according to claim 1 which further comprises:
   (a) a local oscillator; and
   (b) first, second and third IF mixers fed by the local oscillator and respectively by the first, second and third elements of the antenna to produce an intermediate frequency output.
3. A radar height readout system according to claim 1 wherein the pulse generating means consists of a ratio detector.

References Cited

UNITED STATES PATENTS 3,202,990  8/1965  Howells _____ 343—100
3,392,387  7/1968  Kirkpatrick _____ 343—16

RICHARD A. FARLEY, Primary Examiner

RICHARD E. BERGER, Assistant Examiner

U.S. Cl. X.R.

343—16, 100